United States Patent Office 3,215,669
Patented Nov. 2, 1965

3,215,669
NEW SOLUBLE, FUSIBLE POLYMERS OF POLYETHYLENICALLY UNSATURATED COMPOUNDS, AND USE
Paul A. Devlin, Orinda, and Elliot Bergman, Berkeley, Calif., assignors to Shell Oil Company, New York, N.Y., a corporation of Delaware
No Drawing. Filed Apr. 10, 1961, Ser. No. 101,634
14 Claims. (Cl. 260—63)

This invention relates to new polymers and their preparation. More particularly, the invention relates to new low molecular weight polymeric products which act as polyaldehydes, to a method for their preparation and to their utilization, particularly in the formation of surface coating compositions.

Specifically, the invention provides new and particularly useful low molecular weight soluble and fusible polymeric products which act as polyaldehydes and have superior properties in the formation of surface coating compositions. These new polymers comprises the low molecular weight product of polymerization of a polyethylenically unsaturated hydrocarbon and preferably butadiene, an alpha,beta-ethylenically unsaturated aldehyde, such as acrolein, and a third component comprising a liquid material having an active hydrogen attached to carbon, and preferably mesityl oxide. The invention further provides valuable derivatives prepared from these new low molecular weight polymer, as well as useful compositions as surface coating compositions containing the new polymers.

As a preferred embodiment, the invention provides polymeric materials having outstanding properties as can coatings, particularly as to their air-drying properties and hardness, which are prepared by the polymerization of a mixture of a conjugated diene such as butadiene, an alpha,beta-ethylenically unsaturated aldehyde, such as acrolein, an alkenyl-substituted aromatic compound as styrene, and mesityl oxide, the amount of the unsaturated aldehyde in the polymer making up at least 1% by weight, and the amount of the alkenyl-substituted aromatic compound making up at least 2% by weight of the polymer.

In order to permit the packaging of certain materials, such as soft drinks, in metal containers, it has been necessary to develop a new coating for the inside lining of the can. Such a coating must be such that it imparts no taste or contamination of the food material and must have the necessary physical properties to withstand the steps involved in manufacture of the can, such as stamping and soldering operations, sterilization and the like. These require that the coating have good adhesion to the metal, good heat resistance, good flexibility and good resistance to solvents, acids and alkali.

Many attempts have been made to prepare liquid resinous materials that could be used for the above can coating operations, but the results obtained heretofore have not been entirely satisfactory. In many cases, the resinous materials fail to have sufficient adhesion to the metal surfaces. In other cases, the resinous materials did not harden or cure within the required time period. In still other cases, the resulting coating failed to withstand the fabrication operations or failed to have the necessary freedom from taste, odor and the like.

It is an object of the invention, therefore, to provide new polymeric products and a method for their preparation. It is a further object to provide new low molecular weight aldehyde-acting polymers which are particularly suited for use in preparing surface coating compositions. It is a further object to provide new low molecular weight products which have excellent adhesion to metal surfaces. It is a further object to provide new liquid polymers which have good air drying properties. It is a further object to provide new liquid polymers which can be cured to form hard, flexible coatings. It is a further object to provide new liquid polymers which are useful for the coating of cans. It is a further object to provide new low molecular weight polymers which can be used as general purpose primers. It is a further object to provide new low molecular weight polymers which react as polyaldehydes and are useful for preparing many new and valuable polymeric derivatives. These and other objects of the invention will be apparent from the following detailed description thereof.

It has now been discovered that these and other objects can be accomplished by the new polymeric products of the present invention which comprise the low molecular weight products of polymerization of a mixture a polyethylenically unsaturated compound, an alpha,beta-ethylenically unsaturated aldehyde and a liquid material having an active hydrogen attached to carbon, and preferably mesityl oxide. It has been found that these special polymeric products have surprising properties as coating materials. They can, for example, be applied in liquid form to metal surfaces and cured thereon to form films having excellent adhesion to the metal surface. The polymers have good air drying properties and the coatings can be cured in air or by baking. In addition, the coating has good flexibility and hardness and good resistance to water, solvents and the like.

It has also been found that the above-described new polymeric products can be modified to provide even further improvement in properties such as in hardness by the incorporation of an additional monomer, such as, for example, an alkenyl-substituted aromatic compound as styrene, or vinyl naphthalene, alpha-methylstyrene and the like. Films prepared from these special polymers have the above-described superior properties, and in addition greatly improved hardness.

The new polymeric products of the present invention are also unusual in that their outstanding drying properties permits them to be used in the formation of many other types of coating materials, such as general purpose primers, pigmented enamels, paints and the like.

The polyethylenically unsaturated hydrocarbons to be used in the preparation of the new polymers include the polyethylenically unsaturated hydrocarbons and particularly the aliphatic hydrocarbons having at least two ethylenic groups which are preferably in conjugated relationship. Examples of these compounds include, among others, butadiene-1,3, isoprene, dimethyl butadiene, 2,4-hexadiene, 1,3-heptadiene and the like. Especially preferred are the conjugated diolefins containing up to 10 carbon atoms and preferably from 4 to 6 carbon atoms wherein at least one of the double bonds in terminal.

The ethylenically unsaturated aldehydes used in making the new polymers comprise those aldehydes having ethylenic groups in the alpha,beta-position relative to the aldehyde groups, such as, for example, acrolein, alpha and beta-substituted acroleins, such as alpha-ethylacrolein, alpha-decyl acrolein, alpha-chloroacrolein, alpha-cyclohexylacrolein, beta-dodecylacrolein and the like. Preferred aldehydes to be employed to making the polymers include the alpha,beta-monoethylenically unsaturated monoaldehydes containing from 3 to 12 carbon atoms, and especially acrolein and the alpha and beta-substituted acrolein wherein the substituent on the alpha and/or beta positions is an alkyl, cycloalkyl or alkyl group can be no more than 8 carbon atoms. 2-alkenals containing up to 8 carbon atoms come under special consideration.

The other component used in the preparation of the new polymers comprise the liquid material having an active hydrogen atom attached to carbon, such as, for example, vinylcyclohexenes as 4-vinylcyclohexene-1, mesityl oxide, limonene, and the like. The amount of the material having the active hydrogen attached to carbon employed in the process will vary over a wide range depending on the molecular weight of the polymer desired and, in the case of materials, as mesityl oxide, the properties desired in the finished product. In general, the amount of these materials employed will vary from about 1 to 100 mols of the material to be polymerized and preferably from 5 to 100 mols per mol of monomer. It is preferred to maintain this ratio during the course of polymerization by adding the said material intermittently or continuously during the course of the reaction.

Depending upon the application to which the polymeric product is to be applied, the ratio of the three components to be utilized may vary within certain limits. In general, the components should be employed in such proportions that the finished polymer contains from about 1% to 30% by weight of the unsaturated aldehyde, from .5% to 30% by weight of the material having the active hydrogen attached to carbon and from 98.5% to 40% by weight of the polyethylenically unsaturated compound. Preferably for applications such as can coatings, the polymeric product should contain from 3% to 20% by weight of the unsaturated aldehyde, .5% to 20% by weight of the 96.5% to 60% by weight of the polyethylenically unsaturated compound.

As noted above, modified properties, such as improved hardness, can be obtained by utilizing a third monomer, and preferably one that possesses a single $CH_2=C=$ group, such as an alkenyl-substituted aromatic compound as styrene, alpha-methylstyrene, vinyl napthalene, and the like, as well as nitriles as acrylonitrile, methacrylonitrile, and the like, esters as vinyl acetate, vinyl butyrate, allyl acetate, divinyl phthalate, diallyl phthalate, vinyl chloride, vinylidene chloride, methyl acrylate, ethyl acrylate, methyl methacrylate, allyl benzoate, allyl alcohol and the like. Particularly preferred monomers to be employed include the alkenyl-substituted aromatic hydrocarbons preferably containing from 8 to 18 carbon atoms. These third monomers are preferably employed in minor amounts and preferably from .1% to 40% by weight of the monomer mixture.

The new polymeric products of the invention can be prepared by a variety of different techniques. They are preferably prepared by heating the above-described monomers together in the presence of a free-radical yielding catalyst, preferably in an inert atmosphere. The order of mixing the monomers is not important, but for best results it is generally desirable to mix the liquid material containing the active hydrogen with the unsaturated aldehyde and peroxide catalyst, blanket under $N_2$ and then add the polyethylenically unsaturated compound and heat in the presence of the said catalyst.

The polymerization catalysts employed in the process of the invention are preferably the free-radical polymerization catalyst, and particularly the peroxide catalysts, i.e., catalysts having an oxygen atom linked directly to another oxygen atom. Examples of these catalysts include, among others, benzoyl peroxide, acetyl peroxide, cumene hydroperoxide, lauryl peroxide, tertiary-butyl hydroperoxide, di-tertiary-butyl peroxide, 2,2-bis(tertiary-butyl peroxy)-butane, dicumyl peroxide, di-tert-amyl peroxide, and peresters as tert-butyl peracetate, tert-butyl perbenzoate and the like, as well as molecular oxygen, relatively pure or diluted with inert gas, e.g., nitrogen, methane, etc. When using peroxides, about 0.1% to 5% is suitable, although larger or smaller proportions may be employed if desired. Molecular oxygen is used as catalyst by bubbling or dispersing the gas into and through the liquid polymerization mixture. Other materials which generate free radicals can be employed, e.g., azo-bis-isobutyronitrile.

The polymerization is conducted with the polymerizing mixture in liquid phase at about 50° C. to 250° C. Ordinary reflux temperature is often convenient although this temperature is sometimes too low to effect the copolymerization with desired rapidity. Consequently, it is sometimes preferable to operate at higher temperatures where it may be necessary to employ superatmospheric pressures, such as from about 100 to 400 pounds per square inch or even higher in order to keep the polymerizing mixture in the liquid phase.

In some cases, the polymerization is effected by adding one or more of the compounds to the polymerizing mixture during the course of the copolymerization. This procedure is especially useful with mixtures wherein one compound polymerizes at a much faster rate than the other. In some cases, the faster polymerizing compound is added continuously or intermittently during the copolymerization.

In preparing the polymeric products, the polymerization of the entire mixture is ordinarily not carried to completion. Instead, copolymerization is usually continued until about 10% to 50% of the monomer mixture is converted to copolymer and then the unpolymerized monomer or diluent are separated from the formed copolymer by distillation, preferably under reduced pressure. The copolymer obtained in this manner is substantially free of unpolymerized monomer and solvents, if the latter is employed. If the polymeric product is to be used in the preparation of surface coatings where solvents can be utilized, it may be desirable to use the polymer in the solvent medium without separation as noted above.

The preparation process can be conducted in a batchwise, semi-continuous or continuous manner. In continuous operation, the mixture of monomers, catalyst, etc. may be continuously passed through a hot tube and then into a column for separation of the solvent, etc. with the solvent and unreacted monomer being recycled.

The new polymeric products of the invention will vary from liquids to soft or brittle solids, with the preferred products being in the liquid form. The preferred products have ciscosities of not more than 30 poises as 60° C. The new products have low molecular weights, e.g., molecular weights below about 25,000, and preferably between 500 and 10,000. These molecular weights are determined ebullioscopically in solvents, such as toluene. The new products are soluble in conventional hydrocarbon solvents, such as toluene, benzene, and the like, and compatible with various natural and synthetic oils, resins, tars and pitches, such as, for example, phenol-aldehyde resins, melamine resins, coal tars, coal tar pitches, drying oils, and the like.

The new products have active aldehyde groups and active ethylenic groups, both groups being capable of entering into further chemical reaction, and particularly into cross-linking reactions as noted hereinafter.

The new polymeric products can be used for a variety of applications. As noted herein above, they are particularly outstanding in the preparation of surface coatings and particularly can coatings. Such coatings may be colorless varnishes for coating of metal, wood, and the like or as pigmented coatings and enamels. The polymers are particularly suited for use in coating metals, such as those used in making metal containers, as they have good adhesion to metal and form coatings having excellent resistance to chemicals and good resistance to heat. In making coatings of this type, the polymeric products, if in liquid form, may be used as such or they may be dissolved in a suitable solvent and any desired drier, such as cobalt salts and the like added. This mixture may then be applied to the metal by dipping, painting, rolling, spraying or any other suitable means. The coating is then preferably subjected to heat to effect cure. Temperatures used in these applications generally range from about 200° C. to about 450° C. Cure times range from about 5 minutes to about 30 minutes. The cure of the coating may be accomplished at lower temperatures and generally in thicker films by the addition of driers, such as cobalt driers, in amounts generally ranging from about .001% to 1% by weight.

Baked enamels may be prepared from the new polymers by adding pigments, such as titanium dioxide, driers and the like.

The new polymers of the invention can be cross-linked through double bonds by further polymerization or reaction to form solid insoluble infusible plastic products. In this application they may be used in the preparation of castings, moldings and adhesives and coating compositions. The new polymers may also be reacted with epoxidizing materials such as peracids to form new polyepoxides which may be subsequently cured with conventional epoxy curing agents such as amines, acid, anhydrides, metal salts and the like to form cross-linked insoluble infusible materials. In these reactions the new polymers may be used alone or in combination with one or more other reactive ingredients such as one or more unsaturated compounds such as divinyl benzene, diallylbenzene, divinyl succinate, ethylene glycol diacrylate, and the like or other polyepoxides, such as the glycidyl ethers of polyhydric phenols or polyhydric alcohols.

As the new polymers possess a plurality of active aldehyde groups they can undergo many reactions with other materials through these groups. They may, for example, be further reacted with hydrogen to form polymeric materials which are more saturated and contain alcoholic OH groups, with formaldehyde to give methylol-containing derivatives and resinous products, with hydroxylamine to give polymeric oximes, with oxidation agents to give polymeric polycarboxylic acids which form useful esters and salts, with ammonia or amines to give nitrogen-containing derivatives, with mercaptans to give polymeric mercaptals, with phenols to give resinous products, and with urea or melamine to give nitrogen-containing resins.

With polyfunctional reactants, such as primary or secondary amines, the new polymers may be cross-linked to form insoluble infusible products. Examples of such polyfunctional amines include, among others, ethylene diamine, diethylene triamine, butylene diamine, 1,5-pentanediamine, 1,10-decanediamine, durene diamine, p-phenylene diamine, cyclopentane-diamine, N,N'-diethylpropylene diamine and the like and mixtures thereof. It is generally preferred to employ from .3 to 1 equivalent amount of the amine. An equivalent amount in this case refers to an amount needed to furnish 1 amino group per aldehyde group.

The reaction products from the primary mono- and diamines will contain aldimine groups. Such products are useful as latent curing agents for polyepoxides, such as glycidyl ethers of polyhydric phenols and alcohols. When in contact with moisture, the aldimines release the amine which may then enter into reaction with the polyepoxide.

To illustrate the manner in which the invention may be carried out, the following examples are given. It is to be understood, however, that the examples are for the purpose of illustration and the invention is not to be regarded as limited to any of the specific conditions recited therein.

*Example I*

This example illustrates the preparation and use of a liquid copolymer of butadiene, acrolein and mesityl oxide.

To a stainless steel reactor were added the following components:

| | Parts |
|---|---|
| Mesityl oxide | 1350 |
| 4-vinylcyclohexene-1 | 150 |
| Di-tertiary butyl peroxide | 6 |
| Acrolein | 55 |
| Butadiene | 300 |

The vessel was blanketed with nitrogen, heated to 150° C. and the following materials added every hour for 4 hours.

One pump: 200 parts butadiene
Second pump:
  55 parts acrolein
  20 parts mesityl oxide
  6 parts di-tertiary butyl peroxide At the end of 4 hours, the reaction was stopped and the mixture Claisen distilled to 150° C. kettle temperature and 2 mm. pressure. The product recovered was a viscous light colored polymer identified as a copolymer of 83% by weight of butadiene, about 11% by weight of acrolein and about 6% by weight of mesityl oxide. The product had a molecular weight of 1500.

The above-described polymer was dissolved in xylene and thin films applied to tin plates. The coated plates were baked at 400° F. for 15 minutes. The resulting coatings had good adhesion to the plate and demonstrated good flexibility and good resistance to water and solvents.

Another portion of the above-described copolymer was combined with 0.5% cobalt as cobalt naphthenate in xylene solution and the mixture spread on tin panels and allowed to air dry. The resulting films dried rapidly in air to form coatings having good adhesion, good flexibility and good solvent and water resistance.

*Example II*

This example illustrates the preparation of a copolymer of butadiene, acrolein and styrene in mesityl oxide.

To a stainless steel reactor were added the following components:

| | Parts |
|---|---|
| Mesityl oxide | 1350 |
| 4-vinylcyclohexene-1 | 150 |
| Acrolein | 55 |
| Styrene | 55 |
| Di-tertiary butyl peroxide | 6 |

The vessel was blanketed with nitrogen and 300 parts of butadiene added. The vessel was heated to 150° C. and 200 parts of butadiene added every hour for 4 hours. Through another pump was added every hour a solution of 55 parts styrene, 55 parts acrolein, 20 parts mesityl oxide and 6 parts ditertiary butyl peroxide.

At the end of the 4 hour run period, the reaction was stopped, the reaction mixture filtered and then Claisen-topped under vacuum to give a viscous light colored polymer which was identified as a copolymer of 64% by weight butadiene, 12% by weight acrolein, 18% by weight styrene and 6% by weight mesityl oxide. The polymer had a molecular weight of 1980 as determined ebullioscopically in dichloroethane, iodine number of 289; carbonyl value, 0.236; H, 10.2%; carbon, 85.6%, and oxygen, 4.2%.

The above-described polymer is dissolved in xylene and thin films applied to tin plates. The coated plates are baked at 400° F. for 15 minutes. The resulting coatings have good adhesion to the plate and have good flexibility and good resistance to water and solvents. The coatings are particularly hard and tough.

Another portion of the above-described copolymer was dissolved in xylene and the mixture spread on tin panels and allowed to dry in air. The resulting films dried rapidly to form coatings having good adhesion, good flexibility and good solvent resistance.

A related copolymer containing butadiene and mesityl oxide did not air dry.

*Example III*

This example illustrates the preparation and use of a copolymer of butadiene and acrolein prepared in 4-vinylcyclohexene-1.

The following materials were charged to a stainless steel reactor;

| | Parts |
|---|---|
| 4-vinylcyclohexene-1 | 1350 |
| Acrolein | 75 |
| Ditertiary butyl peroxide | 6 |

The vessel was blanketed with nitrogen and 300 parts of butadiene added. The vessel was heated to 150° C. and the following materials added every hour: 200 parts of butadiene through one pump and a solution of 75 parts of butadiene, 6 parts of ditertiary butyl peroxide and 20 parts of 4-vinylcyclohexene-1 through another pump. At the end of 4 hours, the product was Claisen topped to 180° C. kettle temperature and 2 mm. pressure. The resulting product was a viscous light colored polymer. Analysis of the product indicated it was a copolymer of about 86% by weight butadiene, about 9% by weight acrolein and about 5% by weight of vinylcyclohexene having a molecular weight of about 2000, carbonyl value of 0.165 eq./100 g. and iodine number of 370.

The above-described polymer was dissolved in xylene and thin films applied to tin plates. The coated plates were baked at 400° F. for 15 minutes. The resulting coatings had good adhesion to the plate and good flexibility and good resistance to water and solvents.

Another portion of the above-described copolymer was combined with 0.5% cobalt as cobalt naphthenate in xylene solution and the mixture spread on tin panels and allowed to dry in air. The resulting films dried rapidly to form coatings having good adhesion, good flexibility and good solvent resistance.

*Example IV*

Examples I to III are repeated with the exception that the butadiene is replaced with an equal amount of isoprene. Related results are obtained.

*Example V*

Example II is repeated with the exception that the styrene is replaced with an equal weight of alpha-methylstyrene. Related results are obtained.

*Example VI*

Example II is repeated with the exception that the amount of styrene employed varies from 60 parts to 200 parts. Related results are obtained.

*Example VII*

Examples I to III are repeated with the exception that the di-tertiary-butyl peroxide is replaced with an equivalent amount of cumene hydroperoxide. Related results are obtained.

*Example VIII*

56 parts of butadiene and 18 parts of acrolein were added to 130 parts of 4-vinylcyclohexene-1. To this mixture was added 1.64 parts of azo-bis-isobutyronitrile and the mixture heated at 66° C. to 70° C. at about 79 p.s.i.g. for about 4.3 hours. The resulting product was a liquid polymer having an intrinsic viscosity (25°/toluene) of 0.16 dl./g. Analysis indicated the copolymer contained 75% by weight of butadiene. The intense carbonyl band at 5.76μ indicated the polymer had free aldehyde groups. Xylene solutions of this polymer dried rapidly in air to form hard coatings.

*Example IX*

This example illustrates the reaction of a liquid copolymer of butadiene and acrolein with polyamines.

A copolymer containing 76% butadiene and 24% acrolein was dissolved in xylene to give a 10% by weight solution. Portions of this solution were treated with solutions of 3% durene diamine in xylene, 3% p-phenylene diamine in chloroform and 3% ethylene diamine in chloroform such that the amine/polymer ratio varied from 0.03 to 0.4. The mixtures set up to hard castings. The best cures were obtained employing 0.4 part of diamine to 1 part polymer. The ethylene diamine product was insoluble in xylene and colorless. The p-phenylene diamine and durene diamine products were yellow.

*Example X*

Example IX was repeated with the exception that the amine employed was a monoamine, such as aniline. The product was a soluble derivative containing a plurality of aldamine groups.

We claim as our invention:

1. A low molecular weight polymer comprising the product of addition polymerization of a mixture consisting essentially of 98.5% to 40% by weight of a polyethylenically unsaturated hydrocarbon, 1% to 30% by weight of acrolein, and .5% to 30% by weight of mesityl oxide, said polymer having a molecular weight below about 25,000 as determined ebullioscopically and being hydrocarbon solvent soluble.

2. A low molecular weight polymer comprising the product of addition polymerization of a mixture consisting essentially of 98.5% to 40% by weight of a polyethylenically unsaturated hydrocarbon, 1% to 30% by weight of acrolein, and .5% to 30% by weight of mesityl oxide, said polymer having a molecular weight below about 25,000 as determined ebullioscopically and being hydrocarbon solvent soluble.

3. A polymer as defined in claim 2 wherein the polyethylenically unsaturated hydrocarbon is butadiene.

4. A polymer as defined in claim 2 wherein the polyethylenically unsaturated hydrocarbon is isoprene.

5. A polymer as in claim 2 wherein the polymer has a molecular weight between 500 and 10,000 as determined ebullioscopically.

6. A low molecular weight polymer comprising the product of addition polymerization of a mixture consisting essentially of 98.5% to 40% by weight of a conjugated diolefin, 1% to 30% by weight of acrolein, .1% to 40% by weight of an alkenyl-substituted aromatic hydrocarbon and .5% to 30% by weight of mesityl oxide, with the total amount of components in the mixture adding up to 100%, the said polymer having a molecular weight below about 25,000 as determined ebullioscopically and being hydrocarbon solvent soluble.

7. A polymer comprising the product of addition polymerization of a mixture consisting essentially of 98.5% to 40% by weight of a conjugated diolefin, .1% to 30% by weight of acrolein, .1% to 40% by weight of styrene, and .5% to 30% by weight of mesityl oxide, with the total amount of components in the mixture adding up to 100%, the said polymer having a molecular weight below about 25,000 as determined ebullioscopically and being hydrocarbon solvent soluble.

8. A copolymer comprising the product of addition polymerization of a mixture consisting essentially of 98.5% to 40% by weight of isoprene, 1% to 30% by weight of acrolein, .5% to 30% by weight of mesityl oxide and .1% to 40% by weight of styrene, with the total amount of the components in the mixture adding up to 100%, said copolymers having a molecular weight below about 25,000 as determined ebullioscopically and being hydrocarbon solvent soluble.

9. A copolymer comprising the product of addition polymerization of a mixture consisting essentially of 98.5% to 40% by weight of butadiene, 1% to 30% by weight of acrolein, 5% to 30% by weight of mesityl oxide and .1% to 40% by weight of styrene, with the total amount of the components in the mixture adding up to 100%, said copolymers having a molecular weight below about 25,000 as determined ebullioscopically and being hydrocarbon solvent soluble.

10. A polymer comprising the product of addition polymerization of a mixture consisting essentially of 30% to 90% by weight of butadiene, 5% to 25% by weight of acrolein, .1% to 20% by weight of mesityl oxide, with the total amount of components in the mixture adding up to 100%, the said polymer having a molecular weight below about 25,000 as determined ebullioscopically and being hydrocarbon solvent soluble.

11. A polymer comprising the product of addition polymerization of a mixture consisting essentially of 64% by weight of butadiene, 12% by weight of acrolein, 18% by weight of styrene and 6% by weight of mesityl oxide, the said polymer having a molecular weight below 25,000 as determined ebullioscopically and being hydrocarbon solvent soluble.

12. A process for protecting metal surfaces which comprises applying to the surface a layer of the low molecular weight polymer defined in claim 1, and allowing the coating to air dry.

13. A process for coating metal surfaces which comprises applying a layer of the polymer defined in claim 9 to the surface and drying.

14. A process for coating metal surfaces which comprises applying a layer of the polymer defined in claim 10 to the desired surface and drying.

References Cited by the Examiner
UNITED STATES PATENTS

| 2,264,034 | 11/41 | Allen | 260—64 |
| 2,651,624 | 9/53 | Swart | 260—73 |
| 2,687,404 | 8/54 | Robertson | 260—67 |
| 3,040,010 | 6/62 | Shokal | 260—73 |
| 3,079,296 | 2/63 | Houff et al. | 162—68 |
| 3,079,357 | 2/63 | Fischer | 260—29.6 |
| 3,121,700 | 2/64 | Bergman | 260—29.6 |

WILLIAM H. SHORT, *Primary Examiner.*

MILTON STERMAN, JOSEPH R. LIBERMAN,
*Examiners.*